(12) United States Patent
Causey et al.

(10) Patent No.: US 9,134,811 B2
(45) Date of Patent: *Sep. 15, 2015

(54) ANGULAR SENSITIZED KEYPAD

(71) Applicant: AT&T Mobility II LLC, Atlanta, GA (US)

(72) Inventors: Mark Edward Causey, Tucker, GA (US); Jeffrey Norbert Howard, Suwanee, GA (US); Andrew Thomas Smoak, Marietta, GA (US)

(73) Assignee: AT&T Mobility II LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/461,608

(22) Filed: Aug. 18, 2014

(65) Prior Publication Data

US 2014/0354552 A1 Dec. 4, 2014

Related U.S. Application Data

(63) Continuation of application No. 12/571,192, filed on Sep. 30, 2009, now Pat. No. 8,810,516.

(51) Int. Cl.
*G06F 3/023* (2006.01)

(52) U.S. Cl.
CPC ............ *G06F 3/0238* (2013.01); *G06F 3/0234* (2013.01)

(58) Field of Classification Search
CPC ............................. G06F 3/0234; G06F 3/0238
See application file for complete search history.

(56) References Cited

U.S. PATENT DOCUMENTS

| | | |
|---|---|---|
| 5,128,672 A | 7/1992 | Kaehler |
| 5,483,235 A | 1/1996 | Hanson et al. |
| 5,574,482 A | 11/1996 | Niemeier |
| 5,963,671 A | 10/1999 | Comerford et al. |
| 6,307,541 B1 | 10/2001 | Ho et al. |
| 6,573,844 B1 | 6/2003 | Venolia et al. |
| 6,614,422 B1 | 9/2003 | Rafii et al. |
| 6,724,370 B2 | 4/2004 | Dutta et al. |
| 7,215,327 B2 | 5/2007 | Liu et al. |
| 7,376,938 B1 | 5/2008 | Vander Hoeven |

(Continued)

FOREIGN PATENT DOCUMENTS

JP     2000330946     11/2000

OTHER PUBLICATIONS

Office Action mailed Oct. 3, 2014 in U.S. Appl. No. 12/571,117.

(Continued)

*Primary Examiner* — Latanya Bibbins
(74) *Attorney, Agent, or Firm* — Hartman & Citrin LLC

(57) ABSTRACT

Devices and methods are disclosed which relate to improving the efficiency of text input by measuring the angle of each key press and rejecting improbable keys pressed at an off-center angle. Examples include a text-entry device which has logic for resisting error while the user enters text on a keyboard of the text-entry device. Each key determines the angle at which the key is pressed. Logic on the text-entry device assigns a range of acceptable angles to each key. If a key is pressed within the range of acceptable angles, then the entry is permitted. If a key is pressed outside the range of acceptable angles, then the entry is denied. Once text is entered, logic assigns a prediction value to each key based on a statistical probability that the key will be entered next. The keyboard logic then adjusts the range of acceptable angles based on that statistical probability.

20 Claims, 7 Drawing Sheets

(56) References Cited

U.S. PATENT DOCUMENTS

| | | |
|---|---|---|
| 7,583,206 B2 | 9/2009 | Volckers |
| 2002/0035486 A1 | 3/2002 | Huyn et al. |
| 2002/0152203 A1 | 10/2002 | Ostergaard et al. |
| 2002/0171633 A1 | 11/2002 | Brinjes |
| 2003/0095102 A1 | 5/2003 | Kraft |
| 2004/0018857 A1 | 1/2004 | Asokan et al. |
| 2004/0095327 A1 | 5/2004 | Lo |
| 2004/0215726 A1 | 10/2004 | Arning et al. |
| 2005/0071778 A1 | 3/2005 | Tokkonen |
| 2005/0167251 A1 | 8/2005 | Sugimura et al. |
| 2005/0188330 A1 | 8/2005 | Griffin |
| 2005/0225540 A1 | 10/2005 | Kawakami et al. |
| 2005/0253816 A1 | 11/2005 | Himberg et al. |
| 2006/0009891 A1 | 1/2006 | Pawlak et al. |
| 2006/0132446 A1 | 6/2006 | Soh et al. |
| 2006/0168539 A1 | 7/2006 | Hawkins et al. |
| 2006/0256139 A1 | 11/2006 | Gikandi |
| 2006/0279434 A1 | 12/2006 | Wang |
| 2007/0016572 A1 | 1/2007 | Bates et al. |
| 2007/0046641 A1 | 3/2007 | Lim |
| 2007/0229476 A1 | 10/2007 | Huh |
| 2007/0288578 A1 | 12/2007 | Pantalone |
| 2008/0174570 A1 | 7/2008 | Jobs et al. |
| 2008/0281583 A1 | 11/2008 | Slothouber |
| 2008/0309621 A1 | 12/2008 | Aggarwal et al. |
| 2009/0040184 A9 | 2/2009 | Pu et al. |
| 2009/0051661 A1 | 2/2009 | Kraft et al. |
| 2009/0062623 A1 | 3/2009 | Cohen et al. |
| 2009/0106695 A1 | 4/2009 | Perry et al. |
| 2009/0150322 A1 | 6/2009 | Bower et al. |
| 2009/0189864 A1 | 7/2009 | Walker |
| 2009/0195506 A1 | 8/2009 | Geidl |
| 2009/0289958 A1 | 11/2009 | Kim et al. |
| 2009/0319694 A1 | 12/2009 | Slezak et al. |
| 2010/0026650 A1 | 2/2010 | Srivastava et al. |
| 2010/0036833 A1 | 2/2010 | Yeung et al. |
| 2010/0085313 A1 | 4/2010 | Rider |
| 2010/0085317 A1 | 4/2010 | Park et al. |
| 2010/0203874 A1 | 8/2010 | Scott et al. |
| 2010/0259561 A1 | 10/2010 | Forutanpour |
| 2010/0265181 A1 | 10/2010 | Shore |
| 2011/0029862 A1 | 2/2011 | Scott et al. |
| 2012/0050169 A1 | 3/2012 | Ladouceur et al. |
| 2012/0244914 A1 | 9/2012 | Lundy et al. |

OTHER PUBLICATIONS

U.S. Appl. No. 12/570,096 Office Action mailed Oct. 3, 2011.
U.S. Appl. No. 12/570,096 Office Action mailed Mar. 8, 2012.
U.S. Appl. No. 12/570,096 Office Action mailed Apr. 24, 2013.
U.S. Appl. No. 12/570,096 Office Action mailed Sep. 23, 2013.
U.S. Appl. No. 12/571,053 Office Action mailed Nov. 28, 2011.
U.S. Appl. No. 12/571,053 Office Action mailed Jul. 9, 2012.
U.S. Appl. No. 12/571,053 Office Action mailed Nov. 21, 2012.
U.S. Appl. No. 12/571,053 Office Action mailed May 24, 2013.
U.S. Appl. No. 12/571,053 Office Action mailed Sep. 25, 2013.
U.S. Appl. No. 12/571,053 Office Action mailed Apr. 4, 2014.
U.S. Appl. No. 12/571,053 Office Action mailed Jun. 9, 2014.
U.S. Appl. No. 12/571,117 Office Action mailed Nov. 23, 2011.
U.S. Appl. No. 12/571,117 Office Action mailed Jul. 18, 2012.
U.S. Appl. No. 12/571,117 Office Action mailed Nov. 26, 2012.
U.S. Appl. No. 12/571,117 Office Action mailed May 24, 2013.
U.S. Appl. No. 12/571,117 Office Action mailed Sep. 25, 2013.
U.S. Appl. No. 12/571,117 Office Action mailed May 7, 2014.
U.S. Appl. No. 12/571,157 Office Action mailed Dec. 23, 2011.
U.S. Appl. No. 12/571,157 Office Action mailed Aug. 16, 2012.
U.S. Appl. No. 12/571,157 Office Action mailed Mar. 14, 2013.
U.S. Appl. No. 12/571,192 Office Action mailed Dec. 22, 2011.
U.S. Appl. No. 12/571,192 Office Action mailed Nov. 20, 2012.
U.S. Appl. No. 12/571,192 Office Action mailed Jun. 19, 2013.
U.S. Appl. No. 12/571,239 Office Action mailed Dec. 2, 2011.
U.S. Appl. No. 12/571,239 Office Action mailed Jul. 19, 2012.
U.S. Appl. No. 12/571,239 Office Action mailed Nov. 21, 2012.
U.S. Appl. No. 12/571,239 Office Action mailed May 24, 2013.
U.S. Appl. No. 12/571,239 Office Action mailed Sep. 11, 2013.
U.S. Appl. No. 12/571,239 Office Action mailed Apr. 9, 2014.
U.S. Appl. No. 12/571,239 Office Action mailed Jun. 6, 2014.
Hoggan et al., "Investigating the Effectiveness of Tactile Feedback for Mobile Touchscreens," Proc. of SIGCHI Conf. on Human Factors in Computing Systems, pp. 1573-1582 (Apr. 2008).
Hoffmann et al., "TypeRight: A Keyboard with Tactile Error Prevention," Proc. Of the SIGCHI Conf. on Human Factors in Computing Systems, pp. 2265-2268 (Apr. 2009).

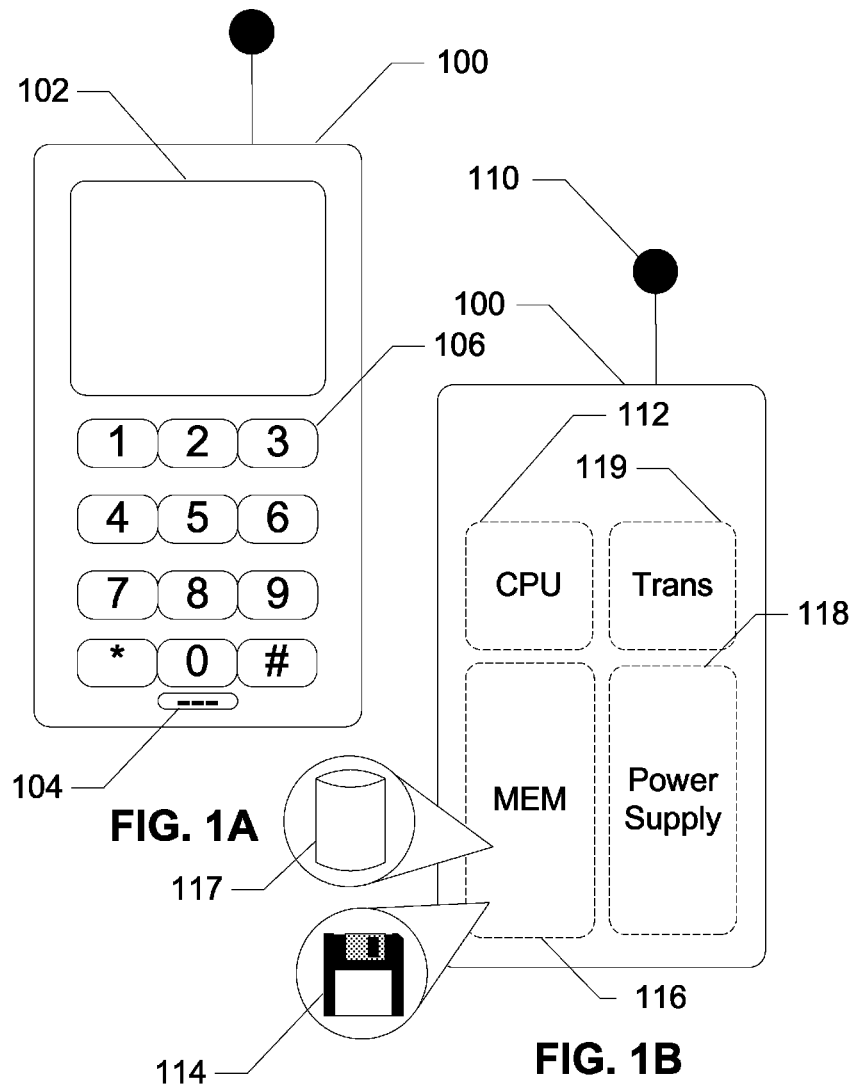

ANGULAR SENSITIZED KEYPAD

CROSS-REFERENCE TO RELATED APPLICATIONS

This application is a continuation of and claims priority to U.S. patent application Ser. No. 12/571,192, now U.S. Pat. No. 8,810,516, filed on Sep. 30, 2009, entitled "Angular Sensitized Keypad," which is expressly incorporated herein by reference in its entirety.

BACKGROUND OF THE INVENTION

1. Field of the Invention

The present invention relates to text-entry devices. More specifically, the present invention relates to determining an acceptable key entry by the angle in which the key is pressed.

2. Background of the Invention

Texting and messaging have become increasingly popular among wireless users. Texting gives users a quick and easy way to send a note to someone else without necessarily interrupting. Cellular providers have created a category of Quick Messaging Devices that are consumer based, messaging centric phones that utilize a virtual or physical full QWERTY keyboard to make typing easier. Within the span of less than a year, this segment has grown at a double digit rate.

The current text input methods on mobile devices are quite cumbersome. The hard keyboards on mobile devices require a careful positioning of the finger on the character to prevent mistyping. This is particularly problematic for the elderly and visually handicapped users. These and many other users have the problem of striking multiple keys at once, often due to the relatively small size of the individual keys.

Physical keys generally require a certain amount of force to depress the key to make a physical contact to register a key press. While the manufacturer can increase or reduce the amount of force needed to press a key, the amount of force needed to press a key is set and does not change. Many mobile devices offer modes of predictive text to help customers enter the words that they intend to type. However most of these modes are based on correcting a word after the word has been mistyped or allowing the customer to choose from a likely list of possibilities as they are typing. Both methods address the problem during or after the process of mistyping a word.

What is needed is a way of avoiding mistyping before the mistyping ever occurs in order to prevent errors and give a user a better experience. Such a device or method should also be able to be used with current predictive text models.

SUMMARY OF THE INVENTION

The present invention includes systems and methods for improving the efficiency of text input by measuring the angle of each key press and rejecting improbable keys pressed at an off-center angle. Exemplary embodiments of the present invention include a text-entry device which has logic for resisting error while the user enters text on a keyboard of the text-entry device. Each key determines the angle at which the key is pressed. Keyboard logic on the text-entry device assigns a range of acceptable angles to each key. If a key is pressed within the range of acceptable angles, which is typically around the center, then the entry is permitted. If a key is pressed outside the range of acceptable angles, which is typically on the edges, then the entry is denied. Once text is entered, the keyboard logic assigns a prediction value to each key based on a statistical probability that the key will be entered next. The keyboard logic then adjusts the range of acceptable angles based on that statistical probability.

In one exemplary embodiment, the present invention is a text-entry device for resisting error while entering text. The text-entry device includes a processor, a memory in communication with the processor, a keyboard in communication with the processor having a plurality of keys and each key determining an angle of force, a display in communication with the processor, and a keyboard logic stored on the memory. The keyboard logic assigns a prediction value to each key after a user enters a key, and adjusts an acceptable angle for at least one key relative to the assigned prediction value.

In another exemplary embodiment, the present invention is a method of resisting error while entering text on a text-entry device having a keyboard. The method includes assigning a prediction value to each key after a user enters a key, and adjusting an acceptable angle for at least one key relative to the assigned prediction value. The keyboard is coupled with a text-entry device.

In yet another exemplary embodiment, the present invention is a computer program stored on a computer readable medium for enhancing a dynamic keyboard. The computer program includes a first code segment for assigning a prediction value to each key after each key entered, and a second code segment for adjusting an acceptable angle for at least one key relative to the assigned prediction value. The keyboard is coupled with a text-entry device.

BRIEF DESCRIPTION OF THE DRAWINGS

FIGS. 1A and 1B show a text-entry device for generating a dynamic keyboard, according to an exemplary embodiment of the present invention.

DETAILED DESCRIPTION OF THE INVENTION

Figure 2A:
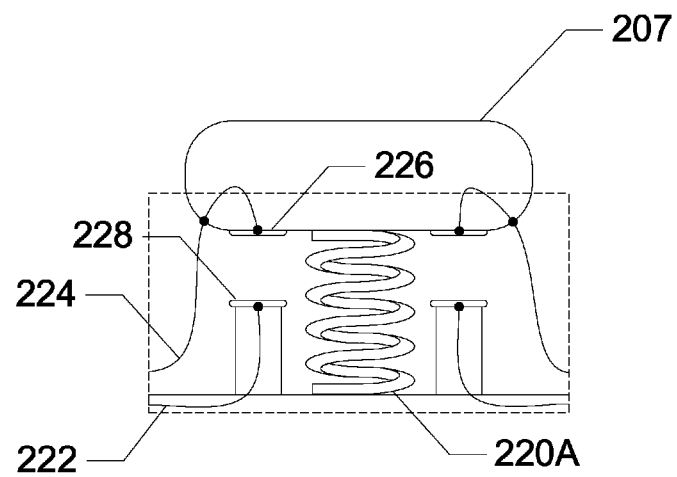
FIG. 2A shows a dynamic key on a keyboard where the pressure and angle of pressure of the dynamic key affect entry, according to an exemplary embodiment of the present invention.

The present invention is a system and method for improving the efficiency of text input by measuring the angle of each key press and rejecting improbable keys pressed at an off-center angle. Exemplary embodiments of the present invention include a text-entry device which has logic for resisting error while the user enters text on a keyboard of the text-entry device. Each key determines the angle at which the key is pressed. Keyboard logic on the text-entry device assigns a range of acceptable angles to each key. If a key is pressed within the range of acceptable angles, which is typically around the center, then the entry is permitted. If a key is pressed outside the range of acceptable angles, which is typically on the edges, then the entry is denied. Once text is entered, the keyboard logic assigns a prediction value to each key based on a statistical probability that the key will be entered next. The keyboard logic then adjusts the range of acceptable angles based on that statistical probability.

Based on predictive text and the intended target key, the text-entry device adjusts acceptable angles of pressure and/or force needed at a particular angle, necessary to hit the secondary or non-target keys surrounding the target key. For example, service providers may want the key pressure to be 190 grams of force to press a key on the QWERTY pad. Service providers may also desire for the keys to be in a convex shape such that they will allow that key to be "clicked" at various angles with varying pressure at each angle.

Furthermore, through predictive text, while typing "questi . . . " the intended 'O' key is the next key to be hit. The text-entry device changes the allowed angle of surrounding keys to avoid accidentally pressing those keys. Common mistypes occur when the user presses the intended key but their thumb accidentally presses the edge of the key next to it. By not allowing off-center angles of presses of non-target keys to be entered, based on predictive text, this would not occur. The key can still be pressed but only at a direct angle.

This design helps facilitate the advantages of predictive text, also known as T9, but combines with the initial input of text before the initial input of text occurs, thereby resisting mistaken keystrokes by the user before they occur. This implementation is not limited to text but can be implemented for numeric and other forms of input where a keyboard is used. For instance, someone dialing a common phone number with a 10 digit dialing keypad that changes the acceptable angles required to press keys as a common number is identified encompasses a further implementation.

For example, most hard keyboards known in the art have small keys that are roughly the same size. With many of these devices, multiple keys may be hit at the same time due to their small size and the lack of space between keys. When the user is an elderly person or visually handicapped person using one of these keyboards, the user may have a hard time pressing the correct key and only the correct key. These groups often accidentally press multiple keys at once as their dexterity and/or vision is decreased. However, they may still desire a small device. The present invention helps to alleviate the issues faced by these groups. As the present invention decreases the sensitivity of keys around the likely keystrokes, the invention makes the intended keys easier to hit. Thus, the user, even with limited sight or dexterity, is able to easily type a message without having to constantly correct accidental keystrokes.

Given a corpus of a language (say English), exemplary embodiments of the invention break down the words into a sequence of characters. Using these sequences of characters, the probability of a particular letter following a character is calculated. Using the above example, the probability of 'U' following 'Q' is very high in the English language since 'Q' is almost always followed by 'U'. This notion can be extended to larger contexts as well, such as the probability of an 'E' entered after the three characters 'S', 'T', and 'E'. These probabilities can be used to modify many facets of the soft keyboard.

"Text-entry device," as used herein and throughout this disclosure, refers to an electronic device which accepts an alphanumeric input often supplied by a virtual or physical keyboard. Examples of a text-entry device include notebook computers, tablet computers, personal digital assistants (PDAs), cellular telephones, smart phones, etc.

"Logic," as used herein and throughout this disclosure, refers to any information having the form of instruction signals and/or data that may be applied to affect the operation of a processor. Examples of processors are computer processors (processing units), microprocessors, digital signal processors, controllers and microcontrollers, etc. Logic may be formed from signals stored in a device memory. Software is one example of such logic. Examples of device memories that may comprise logic include RAM (random access memory), flash memories, ROMS (read-only memories), EPROMS (erasable programmable read-only memories), and EEPROMS (electrically erasable programmable read-only memories). Logic may also be comprised by digital and/or analog hardware circuits, for example, hardware circuits comprising logical AND, OR, XOR, NAND, NOR, and other logical operations. Logic may be formed from combinations of software and hardware.

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

FIGS. 1A and 1B show a text-entry device 100 for generating a dynamic keyboard, according to an exemplary embodiment of the present invention. In this embodiment, text-entry device 100 includes a display 102, a dynamic keypad 106, a microphone 104, an antenna 110, a transceiver 119, a power supply 118, a central processing unit (CPU) 112, and a memory 116. Display 102 is an LCD or LED screen on which a user can view selections, numbers, letters, etc. Microphone 104 allows the user to verbally communicate with others using text-entry device 100. Dynamic keypad 106 allows the user to type letters, numbers, and symbols in order to create text messages, e-mails, etc. Keys of dynamic keypad 106 require different pressures and different angles of pressure according to commands sent from CPU 112. Transceiver 119 allows text-entry device 100 to wirelessly communicate with a network, other wireless devices, etc. Power supply 118 provides power to each of the components of text-entry device 100. CPU 112 commands components of text-entry device 100 according to logic on memory 116. Memory 116 stores logic, data, etc. Among the logic stored on memory 116 is keyboard logic 114. Keyboard logic 114 assigns a prediction value to each key after each key entry, and changes the required pressure and angle of pressure of each key based on each key's prediction value until the next key is entered, at which time the sensitivity is changed again. Keyboard logic 114 references language database 117 when assigning prediction values. Language database 117 contains, among other things, a dictionary, statistical data, etc. For instance, when the user is typing an e-mail, keyboard logic 114 predicts the next key entry that is necessary to complete a word being typed. Keyboard logic 114 instructs CPU 112 to command dynamic keypad 106 to change the required pressure and angle of pressure of the keys. The keys of the predicted next key entry allow less pressure and more acceptable angles than other keys of the dynamic keypad 106 such that they may be entered more easily.

There are many other embodiments of a text-entry device that use a dynamic keyboard. The embodiment in FIGS. 1A and 1B is similar to that of a cellular telephone or smart phone. Another exemplary embodiment is a PDA having a dynamic keyboard. Most users will find typing easiest using their thumbs. However, other embodiments accommodate users for finger typing. Another exemplary embodiment features a laptop computer with a dynamic keyboard. A laptop computer typically has a much larger keyboard than your average PDA and can accommodate a full size keyboard. The keyboard logic can make this typing experience just as easy by resisting error while a user enters text. Also, a numeric keypad such as that of a cellular telephone utilizes a dynamic keypad. When typing text, the keyboard logic assigns a small range of acceptable angles to the numeric keys surrounding a predicted key based on the prediction values of the associated characters similar to that of a QWERTY keyboard. When dialing telephone numbers, the keyboard logic references a contacts list on the cellular telephone and calculates prediction values based on statistical patterns from the contacts list.

FIGS. 2A-2D show various states of a dynamic key on a keypad, according to an exemplary embodiment of the present invention. The dynamic key has multiple contact points such that different angles of pressure allow the multiple upper contact points to come into contact with lower contact points. This creates one or more circuits. As seen in the figures, pressure straight down on the dynamic key pushes both upper contact points against both lower contact points, closing the two circuits. If pressure is not straight down, but rather at an angle from the right, only the right circuit is closed. If the pressure is at an angle from the left, only the left circuit is closed. Although only these two circuits are shown, there may be any number of possible circuits dependent upon many angles of contact. A keyboard logic within a text-entry device determines which circuits need to be closed in order to constitute an acceptable angle for each of the keys on keypad. For instance, with a key that is a probable next entry, the keyboard logic may allow any closed circuits to constitute an acceptable angle, while an improbable key requires all of the circuits to be closed to constitute an acceptable angle. As all, or more, circuits are required to be closed for an improbable key press, accidental hits on these keys are much more unlikely.

FIG. 2A shows a dynamic key on a keyboard where the pressure and angle of pressure of the dynamic key affect entry, according to an exemplary embodiment of the present invention. In this embodiment, the dynamic key includes a button 207, an upper contact 226, an upper contact wire 224, a lower contact wire 222, a spring 220A, and a lower contact 228. Button 207 provides a location for the user to press in order to type a desired character. When button 207 is pressed, upper contact 226 touches lower contact 228, closing a circuit including upper contact wire 224 and lower contact wire 222. Upper contact 226 is a conductive point on either side of the underside of button 207 in communication with upper contact wire 224 which, when in contact with lower contact 228, creates a closed circuit. When this circuit is closed, the dynamic key sends a signal to the device that the key has been pressed. Lower contact 228 is similarly a conductive point that is in communication with lower contact wire 222 which, when in contact with upper contact 226, creates a closed circuit.

Figure 2B:
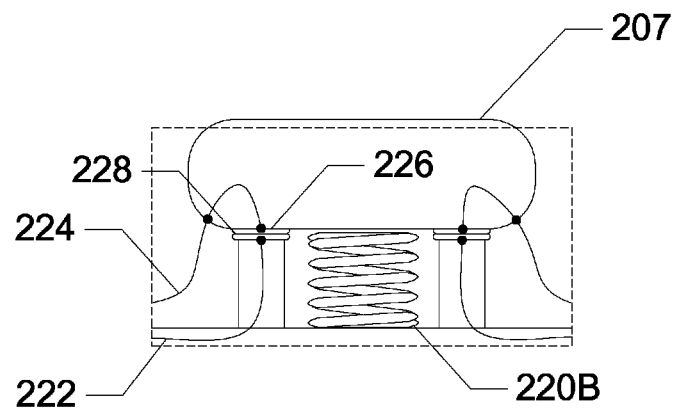
FIG. 2B shows a fully depressed dynamic key on a keyboard, according to an exemplary embodiment of the present invention.

FIG. 2B shows a fully depressed dynamic key on a keyboard, according to an exemplary embodiment of the present invention. In this embodiment, the dynamic key from FIG. 2A has been pressed from directly above the center of button 207. As button 207 is fully depressed from directly above, upper contact 226 is in contact with lower contact 228, completing the closed circuit with contact wire 222. The closed circuit signals a processor and keyboard logic that the dynamic key has been fully depressed at the center. Spring 220B is in a compressed state. Different strengths of springs can be used depending upon a desired necessary pressure or angle of pressure.

Figure 2C:
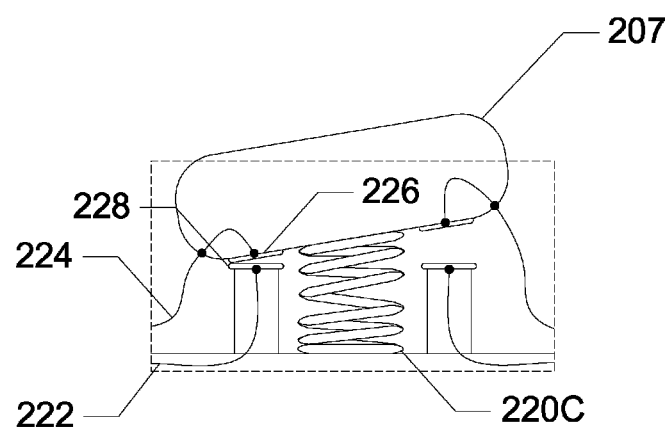
FIG. 2C shows a dynamic key that has been pressed on the left side, according to an exemplary embodiment of the present invention.

FIG. 2C shows a dynamic key that has been pressed on the left side, according to an exemplary embodiment of the present invention. In this embodiment, the left side of button 207 has been pressed. Upper contact 226 has contacted lower contact 228 to create a closed circuit with upper contact wire 224 and lower contact wire 222. However, the circuit on the right side of dynamic key remains open. Spring 220C is not fully depressed. Such an angle only registers if the keyboard logic sets this specific key to accept off-angled key presses. For instance, this key may be a probable next key according to the keyboard logic, or the left side of button 207 is not close to other probable keys.

Figure 2D:
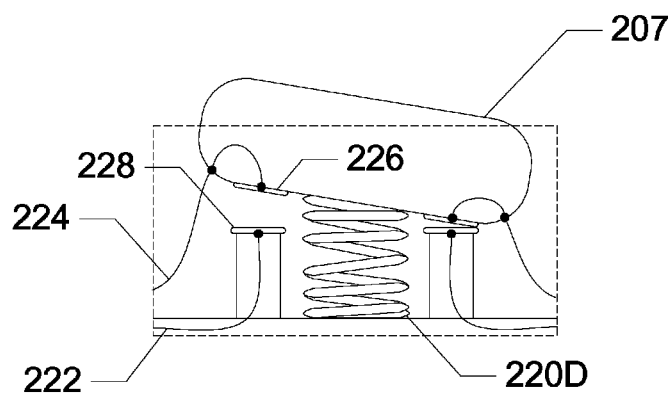
FIG. 2D shows a dynamic key that has been pressed on the right side, according to an exemplary embodiment of the present invention.

FIG. 2D shows a dynamic key that has been pressed on the right side, according to an exemplary embodiment of the present invention. In this embodiment, the right side of button 207 has been pressed. Upper contact 226 is not in contact with lower contact 228. Thus, there is not a circuit created with upper contact 226, lower contact 228, lower contact wire 222, and upper contact wire 224. The circuit on the right side of the dynamic key is closed. Spring 220D is not fully depressed. Such an angle only registers if the keyboard logic sets this specific key to accept off-angled key presses. For instance, this key may be a probable next key according to the keyboard logic, or the right side of button 207 is not close to other probable keys.

Other exemplary embodiments of a dynamic key include more sophisticated angle determinations. The dynamic key in FIG. 2 shows two possible contact points, while other embodiments employ many contact points in a circle around the spring. Also, the dynamic key in FIG. 2 can determine whether a press is centered or off-center, while other embodiments of dynamic keys can qualify an off-center angle. Using a qualified angle, the keyboard logic can apply a range of acceptable angles more effectively. Each key can have its own unique range of acceptable angles. For instance, the letter 'Y' rarely follows 'TH', in the English language, so it should have a smaller range of acceptable angles than a vowel like 'A' or 'E.' However, the letter 'Q' is never going to follow 'TH' unless typing some sort of code, so it should have an even smaller range of acceptable angles than the 'Y.'

Figure 3:
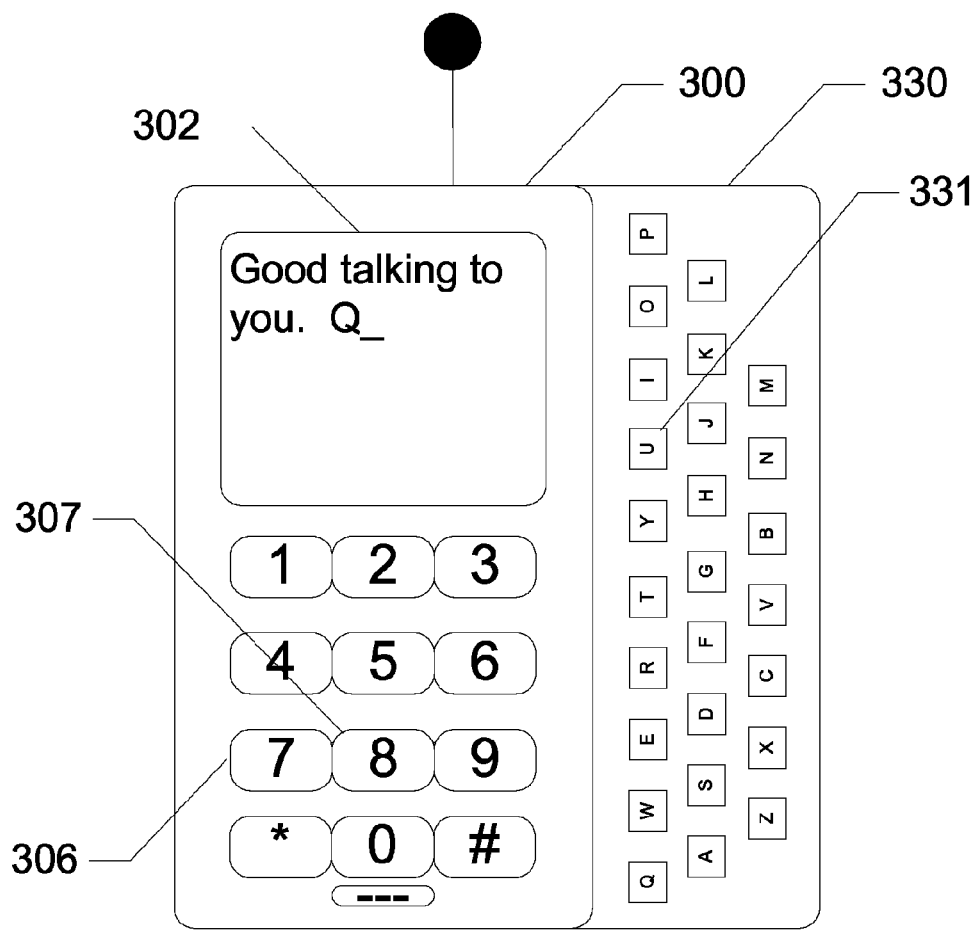
FIG. 3 shows a text-entry device with a slide-out dynamic QWERTY keyboard, according to an exemplary embodiment of the present invention.

FIG. 3 shows a text-entry device 300 with a slide-out dynamic QWERTY keyboard 330, according to an exemplary embodiment of the present invention. In this embodiment, a user has begun typing a message on a dynamic keypad 306 of text-entry device 300, the message visible on a display 302. The last letter the user has selected is 'Q'. As the probability of the next letter being 'U' is very high, a keyboard logic allows 'U' key 331 to be pressed at an angle that closes any of the circuits of 'V' key 331, such as those in FIGS. 2A-2D. The keyboard logic 114 may instruct processor 112 to make keys surrounding 'U' key 331 require full depression at the center, as seen in FIG. 2B, to constitute entry. Thus, it is less likely that these keys are accidentally pressed when attempting to press 'U' key 331. Similarly, '8' key 307, the key corresponding to 'U' when using T9 on a numeric keypad, is also easier to press than other buttons on dynamic keypad 306.

Figure 4:
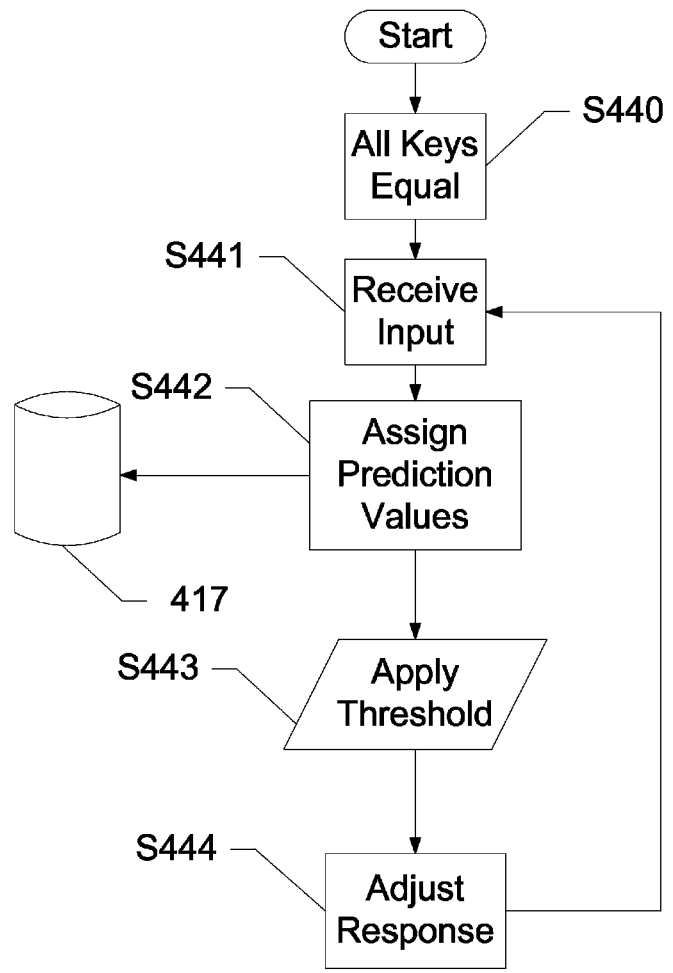
FIG. 4 shows a flowchart of a method of dynamically enhancing a dynamic keyboard of a text-entry device, according to an exemplary embodiment of the present invention.

FIG. 4 shows a flowchart of a method of dynamically enhancing a dynamic keyboard of a text-entry device, according to an exemplary embodiment of the present invention. In this embodiment, when the user begins entering text into an e-mail, text message, or other writing, all of the keys of the dynamic keyboard are equally sensitive S440. Thus, these keys may only require that any contacts below the keys touch, a certain number touch, etc. The dynamic keyboard receives an input S441 from, for example, a key entry. With an input received, keyboard logic 114 on the text-entry device assigns prediction values to each of the keys on the keyboard S442. This is accomplished by referencing language database 417. This prediction value is the chance that a given character with a corresponding key is the character that will be entered by the user to complete a word or sentence. With the prediction values assigned, the keyboard logic 114 applies a selected threshold to each of the keys on the keyboard S443. The database 417 informs the keyboard logic which keys require more centered angles to constitute entry which can be quantified into circuits based upon the prediction values. The keyboard logic 114 then instructs a processor 112 to adjust the response to certain keys S444.

Figure 5A:
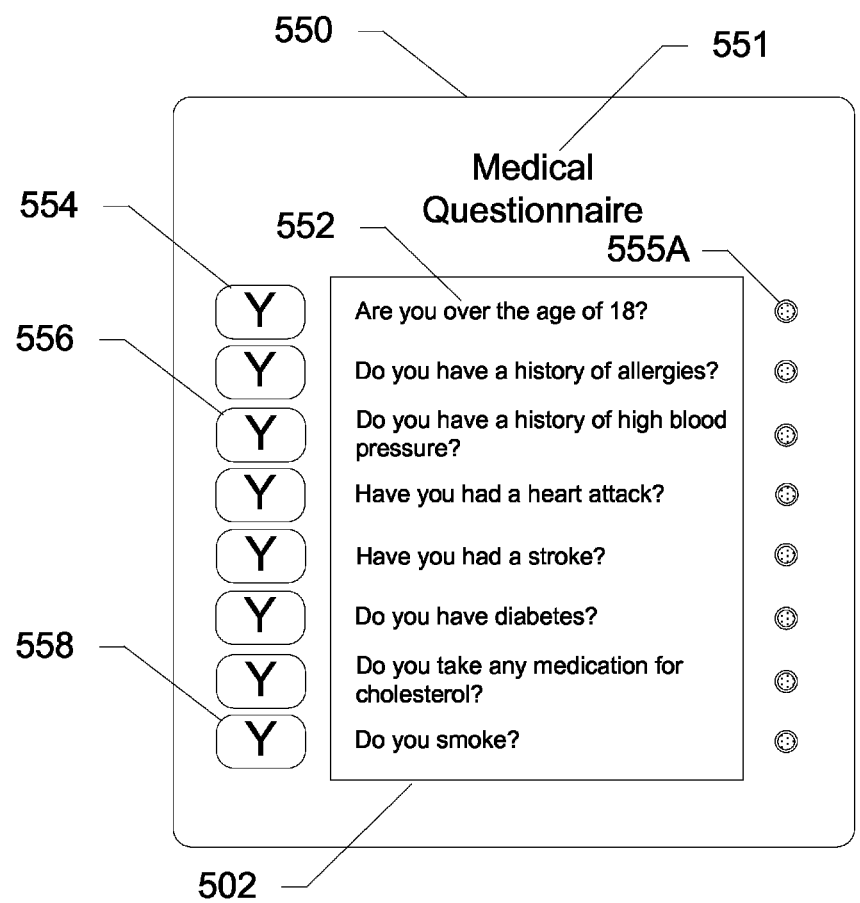
FIGS. 5A and 5B show a dynamic medical questionnaire on a display of a device, according to an exemplary embodiment of the present invention.

FIG. 5A shows a dynamic medical questionnaire 551 on a display 502 of a device 550, according to an exemplary embodiment of the present invention. In this embodiment, dynamic medical questionnaire 551 improves the efficiency of inputs by a user. As shown, the user has not answered a question 552 by selecting key 554 which states that the user is over the age of 18. This is noticeable as a selection indicator 555A is not lit up or marked. Because the user has not stated that the user is over the age of 18, certain medical problems are very unlikely. For instance, the user under the age of 18 may have a history of allergies or have diabetes, but is very unlikely to have high blood pressure, have had a heart attack or stroke, take medication for cholesterol, or smoke regularly. Because the probability of having a history of high blood pressure is very low, key 556 corresponding to this history is only considered by the keyboard logic 114 to be pressed when the angle is substantially centered. For a dynamic key as in FIG. 2, this means that multiple or all contacts on the bottom of key 556 create closed circuits. Because it is possible that the user smokes under age 18, but not probable, key 558 requires more than one of the contacts on the bottom of key 558 to create closed circuits, but not all. The keys which require more closed circuits to select are less likely to be accidentally pressed when the user is answering medical questionnaire 551.

Figure 5B:
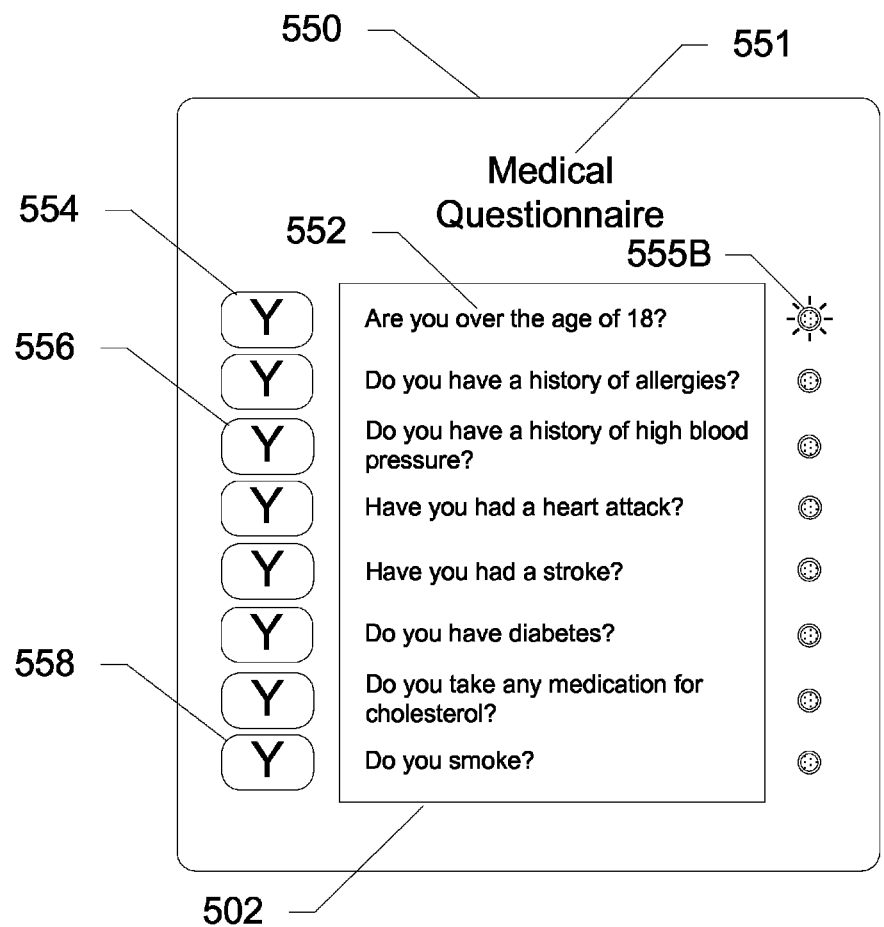

FIG. 5B shows a dynamic medical questionnaire 551 on a display 502 of a device 550, according to an exemplary embodiment of the present invention. In this embodiment, dynamic medical questionnaire 551 improves the efficiency of inputs by a user. As shown, the user has answered question 552, by pressing key 554, which states that the user is over the age of 18. Indicator 555B is now lit, signaling that the user has selected 'YES' for this question. Because the user is over the age of 18, certain medical problems become more likely. For instance, the user over the age of 18 may have a history of allergies, have diabetes, have high blood pressure, have had a heart attack or stroke, take medication for cholesterol, or smoke regularly. Because the probability of having a history of high blood pressure is much higher for a patient over the age of 18 than one under the age of 18, key 556 corresponding to this history is now considered by the keyboard logic 114 to be pressed when one or more of the contacts creates a closed circuit, but less are required than in FIG. 5A. Because it is more probable that the user over the age of 18 smokes than the user under the age of 18, key 558 also requires fewer complete circuits than in FIG. 5A.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A device comprising:
   a processor; and
   a memory that stores instructions that, when executed by the processor, cause the processor to perform operations comprising:
      receiving a selection of a key of a plurality of keys, wherein the key is associated with a question and wherein the selection of the key indicates an answer to the question,
      after receiving the selection of the key of the plurality of keys, assigning a prediction value to at least a portion of the plurality of keys based on the answer to the question associated with the key selected; and
      adjusting an acceptable angle for one of the at least a portion of the plurality of keys relative to the prediction value assigned to the one of the at least a portion of the plurality of keys, the acceptable angle being measured by a plurality of electrical contacts arranged around a center of the one of the at least a portion of the plurality of keys, the plurality of electrical contacts comprising a plurality of upper electrical contacts and a plurality of lower electrical contacts, wherein adjusting the acceptable angle comprises:
         in response to the one of the at least a portion of the plurality of keys being assigned a lower prediction value, increasing a number of the plurality of upper electrical contacts of the one of the at least a portion of the plurality of keys required to contact a number of the plurality of lower electrical contacts of the one of the at least a portion of the plurality of keys to constitute an entry of the one of the at least a portion of the plurality of keys, and
         in response to the one of the at least a portion of the plurality of keys being assigned a higher prediction value, decreasing the number of the plurality of upper electrical contacts of the one of the at least a portion of the plurality of keys required to contact the number of the plurality of lower electrical contacts of the one of the at least a portion of the plurality of keys to constitute the entry of the one of the at least a portion of the plurality of keys.

2. The device of claim 1, wherein the instructions further comprise adjusting the acceptable angle for each of the at least a portion of the plurality of keys to a proportion of the prediction value assigned to each of the at least a portion of the plurality of keys.

3. The device of claim 1, wherein the operations further comprise illuminating an indicator associated with the question based on the selection of the key associated with the question.

4. The device of claim 1, wherein the question is associated with an age of a user of the device.

5. The device of claim 1, further comprising a transceiver.

6. The device of claim 5, wherein the transceiver uses one of cellular RF access technology and WiFi access technology.

7. The device of claim 4, wherein the at least a portion of the plurality of keys is associated with questions regarding medical problems.

8. A method comprising:
receiving, by a text-entry device comprising a processor, a selection of a key of a plurality of keys, wherein the key is associated with a question and wherein the selection of the key indicates an answer to the question;
after receiving the selection of the key of the plurality of keys, assigning, by the processor, a prediction value to at least a portion of the plurality of keys based on the answer to the question associated with the key selected; and
adjusting, by the processor, an acceptable angle for one of the at least a portion of the plurality of keys relative to the prediction value assigned to the one of the at least a portion of the plurality of keys, the acceptable angle being measured by a plurality of contacts arranged around a center of the one of the at least a portion of the plurality of keys, the plurality of contacts comprising a plurality of upper contacts and a plurality of lower contacts, wherein adjusting the acceptable angle comprises:
in response to the one of the at least a portion of the plurality of keys being assigned a lower prediction value, increasing a number of the plurality of upper contacts of the one of the at least a portion of the plurality of keys required to contact a number of the plurality of lower contacts of the one of the at least a portion of the plurality of keys to constitute an entry of the one of the at least a portion of the plurality of keys, and
in response to the one of the at least a portion of the plurality of keys being assigned a higher prediction value, decreasing the number of the plurality of upper contacts of the at least a portion of the plurality of keys required to contact the number the plurality of lower contacts of the one of the at least a portion of the plurality of keys to constitute the entry of the one of the at least a portion of the plurality of keys, wherein the plurality of keys is coupled with the text-entry device.

9. The method of claim 8, further comprising adjusting the acceptable angle for each of the at least a portion of the plurality of keys to a proportion of the prediction value assigned to each of the at least a portion of the plurality of keys.

10. The method of claim 8, further comprising measuring an angle of a key press.

11. The method of claim 8, further comprising illuminating an indicator associated with the question based on the selection of the key associated with the question.

12. The method of claim 8, wherein the question is associated with an age of a user of the text-entry device.

13. The method of claims 8, further comprising resetting the plurality of keys such that the acceptable angle of each of the plurality of keys is substantially similar.

14. The method of claim 8, wherein the at least a portion of the plurality of keys is associated with questions regarding medical problems.

15. A non-transitory tangible computer readable medium having stored thereon computer instructions that, when executed by a processor of a device, cause the processor to perform operations comprising:
receiving a selection of a key of a plurality of keys, wherein the key is associated with a question and wherein the selection of the key indicates an answer to the question;
after receiving the selection of the key of the plurality of keys, assigning a prediction value to at least a portion of the plurality of keys based on the answer to the question associated with the key selected; and
adjusting an acceptable angle for one of the at least a portion of the plurality of keys relative to the prediction value assigned to the one of the at least a portion of the plurality of keys, the acceptable angle being measured by a plurality of contacts arranged around a center of the one of the at least a portion of the plurality of keys, the plurality of contacts comprising a plurality of upper contacts and a plurality of lower contacts, wherein adjusting the acceptable angle comprises:
in response to the one of the at least a portion of the plurality of keys being assigned a lower prediction value, increasing a number of the plurality of upper contacts of the one of the at least a portion of the plurality of keys required to contact a number of the plurality of lower contacts of the one of the at least a portion of the plurality of keys to constitute an entry of the one of the at least a portion of the plurality of keys, and
in response to the one of the at least a portion of the plurality of keys being assigned an higher prediction value, decreasing the number of the plurality of upper contacts of the one of the at least a portion of the plurality of keys required to contact the number of the plurality of lower contacts of the one of the at least a portion of the plurality of keys to constitute the entry of the one of the at least a portion of the plurality of keys.

16. The non-transitory tangible computer readable medium of claim 15, wherein the operations further comprise adjusting the acceptable angle for each of the portion of the plurality of keys to a proportion of the prediction value assigned to each of the at least a portion of the plurality of keys.

17. The non-transitory tangible computer readable medium of claim 15, wherein the operations further comprise measuring an angle of a key press.

18. The non-transitory tangible computer readable medium of claim 15, wherein the operations further comprise illuminating an indicator associated with the question based on the selection of the key associated with the question.

19. The non-transitory tangible computer readable medium of claim 15, wherein the question is associated with an age of a user of the device.

20. The non-transitory tangible computer readable medium of claim 15, wherein the operations further comprise resetting the plurality of keys such that the acceptable angle of each of the plurality of keys is substantially similar.

* * * * *